E. L. WEIL.
WASHER FOR THE STEMS OF VALVES.
APPLICATION FILED DEC. 10, 1919.
1,344,744. Patented June 29, 1920.
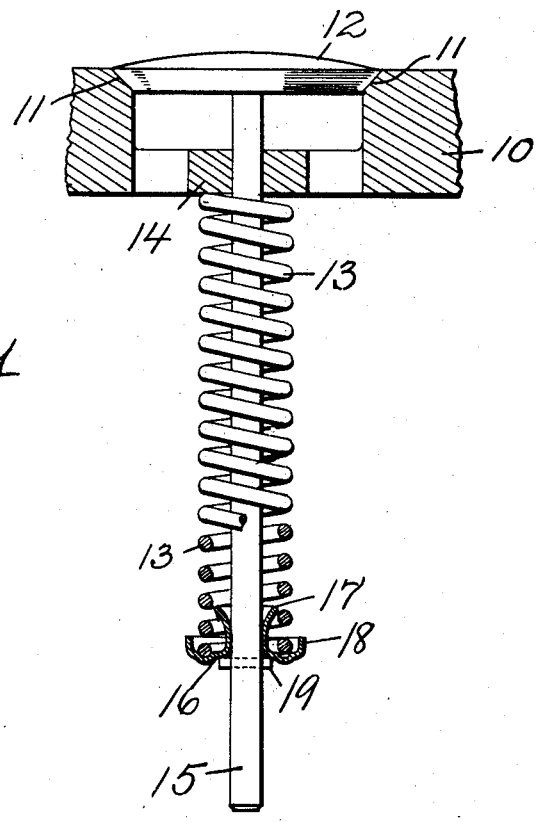
Fig. 1
Fig. 2
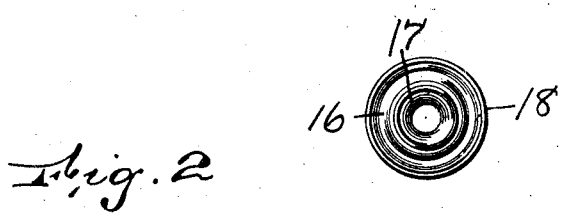

UNITED STATES PATENT OFFICE.

EDWARD L. WEIL, OF KEARNEY, NEW JERSEY.

WASHER FOR THE STEMS OF VALVES.

1,344,744.　　　　　Specification of Letters Patent.　　Patented June 29, 1920.

Application filed December 10, 1919. Serial No. 343,895.

*To all whom it may concern:*

Be it known that I, EDWARD L. WEIL, a citizen of the United States, and a resident of Kearney, county of Hudson, and State of New Jersey, have invented certain new and useful Improvements in Washers for the Stems of Valves, of which the following is a specification.

This invention is designed to provide a washer for the stems of valves, such as the valves used in hydrocarbon engines, and is used in conjunction with a spring which rests on the washer and has the other end abutting on a fixed part of the machine to normally hold the valve shut.

The object of this invention is to provide a washer which does away with the vexatious delay now necessary in replacing the valve, that is, that step of the replacing which involves the compression of the spring and the sliding of the washer over the end of the valve stem in order that it can be fixed to the stem under the proper tension.

The invention is illustrated in the accompanying drawing, in which Figure 1 is a side view of a valve stem and the spring, in this view a small part of the engine and the washer and the lower end of the spring being shown in section, and Fig. 2 is a top view of the washer.

In order to clearly describe the advantages of the construction, enough of an engine is shown to illustrate where it is located. In the drawing, 10 indicates the frame of an engine, which engine is of a hydrocarbon or internal combustion type, and which has a valve seat 11, against which a valve 12 is adapted to be seated, the valve being opened usually by cams, not shown in the drawing, and being closed by the pressure of the spring 13, which has one end abutting on a fixed element, such as the bearing 14, and the other end abuts on a washer which is fastened, against downward movement, to the valve stem 15.

The improved form of washer comprises an annular base portion 16, which can be slightly hollowed or provided with an annular groove to positively seat the spring 13 in the washer, and the washer has an upwardly extending inner flange 17, the flange, near its lower portion, substantially fitting the stem 15, and at its upper end being flared so that it nearly touches the spring 13, so that there is no opportunity of any stem of an appreciable size being caught between the flared flange and the bore of the spring.

If desired, an outside flange 18 may project up from the washer, but it is not as high as the flange 17, as only sufficient height is required to insure the spring being held on the washer in a manner to prevent its excess side movement.

When the engine is being assembled, or when the valves have been taken out to permit them to be ground, when it comes time to replace them the valve is put in place and the spring 13 is slipped on the valve stem, but it is not under compression, and when it is compressed, when the ordinary washer is used on the outer end of the spring it is a difficult and vexatious job, as the tension under which the work is being done makes it hard to find the hole in the washer with the end of the stem.

With this improved washer the flare combines with the spring to guide the end of the valve stem directly through the washer and there is no time lost due to any difficulty of assembling. When the washer has been pushed up high enough on the valve stem to give the spring the required tension, it is properly secured in place, the form shown consisting of a pin 19 which is slipped through a perforation in the stem and prevents the washer from slipping down.

I claim:

1. A washer for use with valve stems of internal combustion engines comprising an annular base portion adapted to receive a helical spring, and a flange projecting from the inner edge of said annular base portion and flaring upwardly with its outer edge of but slightly smaller diameter than the inside of the spring.

2. A washer for use with the stems of valves of internal combustion engines comprising an annular base portion having an outside flange and an inside flange, the inside flange flaring upwardly and at its smallest diameter being of substantially the same diameter as the stem, and at its upper end and largest diameter being but little less in diameter than the inside of the spring.

In testimony that I claim the foregoing, I have hereto set my hand, this 9th day of December, 1919.

EDWARD L. WEIL.